(12) United States Patent
Doi et al.

(10) Patent No.: US 12,198,167 B2
(45) Date of Patent: Jan. 14, 2025

(54) QUANTUM CRYPTOGRAPHIC DEVICE, QUANTUM CRYPTOGRAPHIC COMMUNICATION FEE CALCULATION SYSTEM, AND QUANTUM CRYPTOGRAPHIC COMMUNICATION FEE CALCULATION METHOD

(71) Applicant: KABUSHIKI KAISHA TOSHIBA, Tokyo (JP)

(72) Inventors: Kazuaki Doi, Kawasaki Kanagawa (JP); Mamiko Kujiraoka, Kawasaki Kanagawa (JP); Yoshimichi Tanizawa, Yokohama Kanagawa (JP); Hideaki Sato, Yokohama Kanagawa (JP); Ririka Takahashi, Setagaya Tokyo (JP); Akira Murakami, Tama Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 996 days.

(21) Appl. No.: 17/249,289

(22) Filed: Feb. 25, 2021

(65) Prior Publication Data

US 2021/0328784 A1 Oct. 21, 2021

(30) Foreign Application Priority Data

Apr. 16, 2020 (JP) .................................. 2020-073718

(51) Int. Cl.
*H04L 9/08* (2006.01)
*G06F 21/10* (2013.01)
(Continued)

(52) U.S. Cl.
CPC ..... *G06Q 30/0283* (2013.01); *G06F 21/1078* (2023.08); *H04L 9/0855* (2013.01); *H04L 12/14* (2013.01)

(58) Field of Classification Search
CPC ............ G06Q 30/0283; G06F 21/1078; H04L 9/0855; H04L 12/14; H04L 9/0852; H04L 9/0858
See application file for complete search history.

(56) References Cited

U.S. PATENT DOCUMENTS 7,706,535 B1 * 4/2010 Pearson ................ H04L 9/0855
380/255
9,356,780 B2 * 5/2016 Tanizawa ................ H04L 63/06
(Continued)

FOREIGN PATENT DOCUMENTS

EP 4246875 A1 * 9/2023 ........... H04L 45/123
EP 4287552 A1 * 12/2023 ........... H04L 9/0852
JP 2014-103514 A 6/2014

OTHER PUBLICATIONS

Soh et al., Self-Referenced Continuous-Variable Quantum Key Distribution Protocol, American Physical Society (Year: 2015).*
(Continued)

*Primary Examiner* — David Garcia Cervetti
(74) *Attorney, Agent, or Firm* — Finnegan, Henderson, Farabow, Garrett & Dunner, LLP

(57) ABSTRACT

According to an embodiment, a quantum cryptographic device includes a memory and one or more processors coupled to the memory. The one or more processors are configured to: tabulate information on an application key transmitted and received by using a quantum cryptographic key and output an application-key information tabulation result; calculate a unit price of the application key based on the application-key information tabulation result; and display information that is display information including the unit price of the application key.

16 Claims, 12 Drawing Sheets

(51) Int. Cl.
*G06Q 30/0283* (2023.01)
*H04L 12/14* (2006.01)

(56) References Cited

U.S. PATENT DOCUMENTS

| | | | | |
|---|---|---|---|---|
| 9,509,589 B2* | 11/2016 | Tanizawa | ................ | H04L 45/14 |
| 11,258,580 B2* | 2/2022 | Griffin | ................. | H04L 9/0858 |
| 11,290,368 B2* | 3/2022 | Griffin | ................... | H04L 45/04 |
| 11,423,141 B2* | 8/2022 | Coady | .................. | H04L 9/0858 |
| 11,424,836 B2* | 8/2022 | Cavaliere | ............... | H04L 45/62 |
| 2004/0136535 A1* | 7/2004 | Takeuchi | .............. | H04L 9/0852 |
| | | | | 380/256 |
| 2004/0184603 A1* | 9/2004 | Pearson | ............... | H04L 9/0855 |
| | | | | 380/28 |
| 2006/0120520 A1* | 6/2006 | Suzuki | ................. | G06F 21/602 |
| | | | | 380/28 |
| 2007/0076871 A1* | 4/2007 | Renes | .................. | H04L 9/0858 |
| | | | | 348/E7.056 |
| 2014/0013101 A1* | 1/2014 | Tanizawa | .............. | H04L 9/0861 |
| | | | | 713/150 |
| 2014/0023192 A1* | 1/2014 | Tanizawa | .............. | H04L 9/0827 |
| | | | | 380/44 |
| 2014/0089663 A1* | 3/2014 | Tanizawa | ............ | H04L 63/0428 |
| | | | | 713/168 |
| 2014/0143443 A1* | 5/2014 | Takahashi | ............... | H04L 45/38 |
| | | | | 709/241 |
| 2014/0208116 A1* | 7/2014 | Tanizawa | ............ | H04L 63/0428 |
| | | | | 713/171 |
| 2015/0270963 A1* | 9/2015 | Tanizawa | .............. | H04L 9/0852 |
| | | | | 713/171 |
| 2016/0197723 A1* | 7/2016 | Takahashi | ........... | G06F 11/0709 |
| | | | | 380/255 |
| 2016/0269177 A1* | 9/2016 | Tanizawa | .............. | H04L 9/0858 |
| 2016/0277183 A1* | 9/2016 | Murakami | ............ | H04L 9/0858 |
| 2016/0285629 A1* | 9/2016 | Tanizawa | .............. | H04L 9/0852 |
| 2016/0307381 A1* | 10/2016 | Siebels | ................... | G06F 21/88 |
| 2016/0352516 A1* | 12/2016 | Oberheide | ............ | H04L 9/0897 |
| 2018/0069698 A1* | 3/2018 | Hong | ..................... | H04L 9/083 |
| 2018/0241553 A1* | 8/2018 | Lucamarini | ................ | H04B 10/70 |
| 2019/0190707 A1* | 6/2019 | Tomita | .................... | G02F 1/035 |
| 2021/0133614 A1* | 5/2021 | Ashrafi | ................... | G06N 10/00 |

OTHER PUBLICATIONS

R. Takahashi, et al., "A high-speed key management method for quantum key distribution network," 11th Int'l Conf. on Ubiquitous and Future Networks (ICUFN 2019), pp. 437-442 (2019).

Y. Cao et al: "Cost-Efficient Quantum Key Distribution (QKD) Over WDM Networks," IEEE J. of Optical Communications and Networking, vol. 11, No. 6, pp. 285-298 (Jun. 2019).

H. Kim et al., "AAP Additional Review comments for ITU-T Y.3800 (Y.QKDN_FR): 'Framework for Networks supporting Quantum Key Distribution,'" ITU SG-TD289/WP3, 21 pages (Oct. 2019).

* cited by examiner

| LINK ID | DISTANCE OF QKD LINK (km) | GENERATION RATE OF QUANTUM CRYPTOGRAPHIC KEY (bps) | STORAGE AMOUNT OF QUANTUM CRYPTOGRAPHIC KEY (BYTES) | QbER OF QKD LINK (%) |
|---|---|---|---|---|
| A | 20 | 2M | 10G | 3.5 |
| B | 10 | 5M | 20G | 3 |
| C | 30 | 500K | 2G | 4 |
| D | 15 | 3M | 3G | 2.5 |
| E | 5 | 10M | 40G | 3.5 |
| F | 25 | 1M | 1G | 3 |

| APPLICATION-KEY SHARING DESTINATION NODE (STARTING NODE SIDE) | APPLICATION-KEY SHARING ROUTE | DISTANCE (km) | NUMBER OF RELAY NODES | GENERATION RATE OF APPLICATION KEY (bps) | STORAGE AMOUNT OF APPLICATION KEY (BYTES) |
|---|---|---|---|---|---|
| 1 | A→B | 30 | 1 | 2M | 50G |
| 2 | C | 30 | 0 | 500K | 20G |
| 3 | D→E→F | 45 | 2 | 1M | 30G |

FIG.9

| APPLICA-TION KEY ID | START-ING NODE | DATA SIZE (BITS) | DISTANCE (km) | NUMBER OF RELAY NODES | GENERATION RATE OF APPLICATION KEY (bps) | STORAGE AMOUNT OF APPLICATION KEY (BYTES) |
|---|---|---|---|---|---|---|
| 1 | 1 | 1M | 30 | 1 | 2M | 50G |
| 2 | 3 | 1M | 45 | 2 | 1M | 30G |
| 3 | 2 | 1M | 30 | 0 | 500K | 20G |
| 4 | 2 | 1M | 30 | 0 | 500K | 20G |
| 5 | 1 | 1M | 30 | 1 | 2M | 50G |
| 6 | 3 | 1M | 45 | 2 | 1M | 30G |

QUANTUM CRYPTOGRAPHIC DEVICE, QUANTUM CRYPTOGRAPHIC COMMUNICATION FEE CALCULATION SYSTEM, AND QUANTUM CRYPTOGRAPHIC COMMUNICATION FEE CALCULATION METHOD

CROSS-REFERENCE TO RELATED APPLICATIONS

This application is based upon and claims the benefit of priority from Japanese Patent Application No. 2020-073718, filed on Apr. 16, 2020; the entire contents of which are incorporated herein by reference.

FIELD

Embodiments described herein relate generally to a quantum cryptographic device, a quantum cryptographic communication fee calculation system, and a quantum cryptographic communication fee calculation method.

BACKGROUND

The advancement of information communication technology has led to the exchange of diverse data and ensuring the confidentiality, security, and the like of transmitted information has become a major issue. Quantum cryptographic communication technology is expected to be implemented as a cryptographic technique that cannot be deciphered even if the computing power of a computer is improved. As a business model of security systems using quantum cryptographic communication, there is a business model that determines a service fee based on usage of application key transmitted in quantum cryptography communication (hereinafter referred to as "application key"). In general, in a security system using quantum cryptographic communication, a service fee is calculated with the unit price per bit of the application key that is fixed.

With conventional technologies, it has been difficult to vary the unit price of the application key transmitted by cryptographic communication using a cryptographic key generated by a quantum cryptographic communication system to a more appropriate value depending on the usage of the application key.

BRIEF DESCRIPTION OF THE DRAWINGS

FIG. 9 is a diagram illustrating an example of an application-key information DB in the first embodiment;

DETAILED DESCRIPTION

According to an embodiment, a quantum cryptographic device includes a memory and one or more processors coupled to the memory. The one or more processors are configured to: tabulate information on an application key transmitted and received by using a quantum cryptographic key and output an application-key information tabulation result; calculate a unit price of the application key based on the application-key information tabulation result; and display information that is display information including the unit price of the application key.

With reference to the accompanying drawings, the following describes in detail exemplary embodiments of a quantum cryptographic device, a quantum cryptographic communication fee calculation system, and a quantum cryptographic communication fee calculation method.

First Embodiment

First, examples of a basic configuration of a quantum cryptographic communication system will be described.

First Example of Basic Configuration

Figure 1:
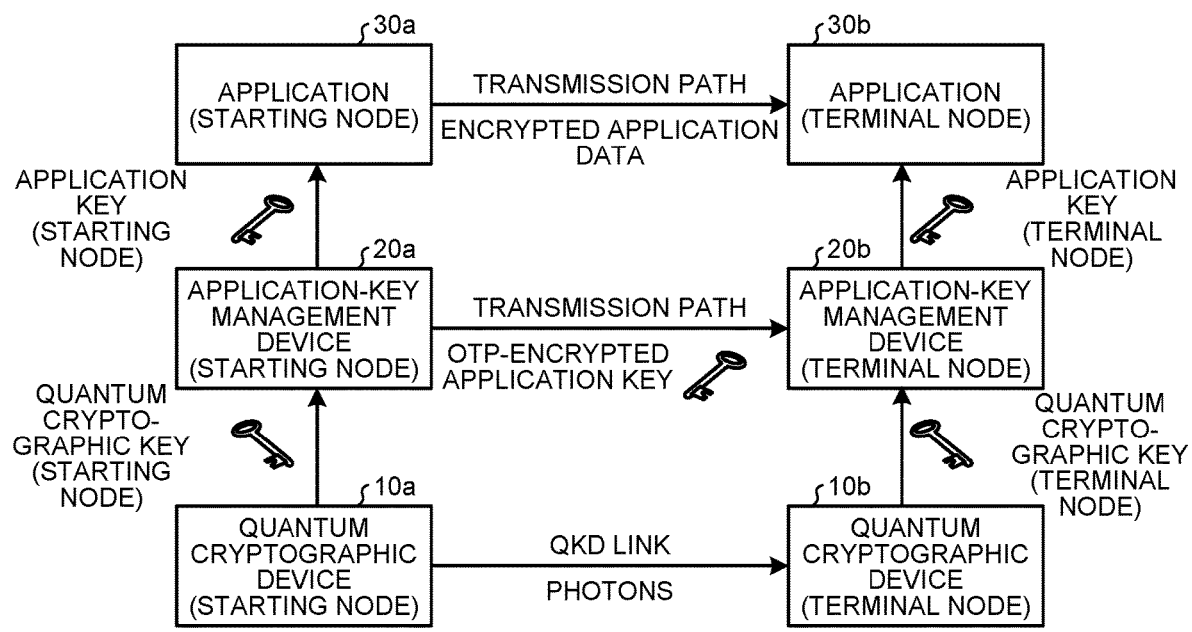
FIG. 1 is a diagram illustrating a first example of a basic configuration of a quantum cryptographic communication system according to a first embodiment.

FIG. 1 is a diagram illustrating a first example of the basic configuration of the quantum cryptographic communication system according to a first embodiment. First, a quantum cryptographic device 10a (starting node) transmits photons that are the source of a quantum cryptographic key to a quantum cryptographic device 10b (terminal node) via a quantum key distribution (QKD) link. The quantum cryptographic device 10a generates a quantum cryptographic key (starting node) based on the transmitted photons, and the quantum cryptographic device 10b generates a quantum cryptographic key (terminal node) based on the received photons. The quantum cryptographic key (starting node) and the quantum cryptographic key (terminal node) are shared bit data and are identical. Then, the quantum cryptographic device 10a transmits the quantum cryptographic key (starting node) to an application-key management device 20a (starting node), and the quantum cryptographic device 10b transmits the quantum cryptographic key (terminal node) to an application-key management device 20*b* (terminal node).

Subsequently, the application-key management devices 20*a* and 20*b* share an application key. The application key is a cryptographic key used when an application 30*a* (starting node) encrypts and transmits application data.

A sharing method of application key will be described. The sharing method is basically as described in non-patent literature "R. Takahashi, Y. Tanizawa, and A. Dixon, "A high-speed key management method for quantum key distribution network" 2019 Eleventh International Conference on Ubiquitous and Future Networks (ICUFN), Zagreb, Croatia, 2019, pp. 437-442", for example. First, the application-key management device 20*a* generates an application key by a random number generator and the like. Then, the application-key management device 20*a* performs one time pad (OTP) encryption using a quantum cryptographic key on the application key and generates an OTP-encrypted application key. The application-key management device 20*a* transmits the OTP-encrypted application key to the application-key management device 20*b*. The OTP-encrypted application key is transmitted and received via a transmission path (wired or wireless) corresponding to the QKD link. The application-key management device 20*b* performs OTP decryption using a quantum cryptographic key on the OTP-encrypted application key and decrypts the application key. In this way, the application key is shared by the application-key management devices 20*a* and 20*b*.

The applications 30*a* and 30*b* acquire the application key from the application-key management devices 20*a* and 20*b*, respectively, at any desired timing. Specifically, after the application 30*a* retrieves the application key from the application-key management device 20*a*, the application 30*b* acquires from the application-key management device 20*b* the application key identical to the application key acquired by the application 30*a*.

After the application key is shared by the applications 30*a* and 30*b*, when the application 30*a* transmits application data, the application 30*a* performs encryption using the application key on the application data and transmits the application data. The devices on which the applications 30*a* and 30*b* operate are any device such as a smart device, a personal computer, and the like, for example. This is the description of the basic configuration.

Figure 2:
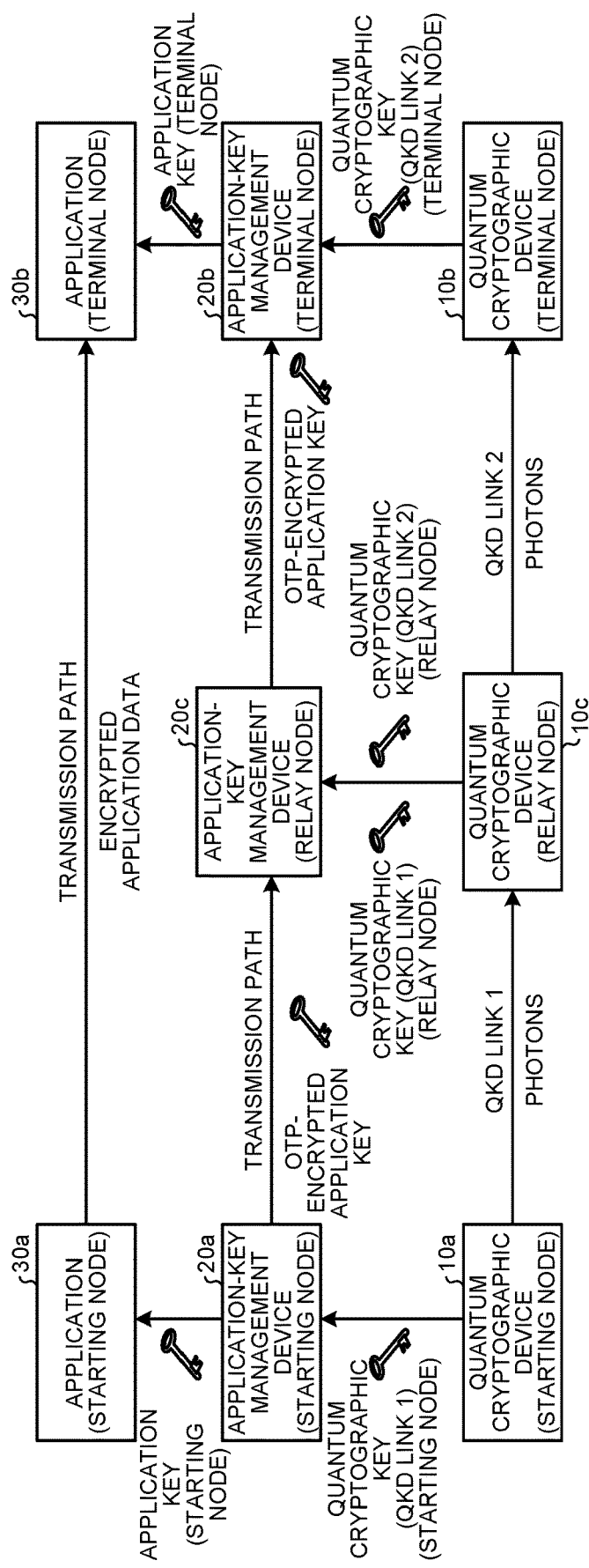
FIG. 2 is a diagram illustrating a second example of the basic configuration of the quantum cryptographic communication system of the first embodiment.

In FIG. 1, although the starting node and the terminal node are directly connected, the basic operation is the same even when a relay node is interposed between the starting node and the terminal node. FIG. 2 illustrates the configuration in which one relay node is interposed between the starting node and the terminal node.

Second Example of Basic Configuration

FIG. 2 is a diagram illustrating a second example of the basic configuration of the quantum cryptographic communication system of the first embodiment. When one quantum cryptographic device 10*c* (relay node) is interposed, the number of QKD links (optical fibers) is two. In a QKD link 1, the quantum cryptographic device 10*a* (starting node) and the quantum cryptographic device 10*c* (relay node) share a quantum cryptographic key (QKD link 1), and in a QKD link 2, the quantum cryptographic device 10*c* (relay node) and the quantum cryptographic device 10*b* (terminal node) share a quantum cryptographic key (QKD link 2).

When the application 30*a* (starting node) and the application 30*b* (terminal node) share an application key, the application-key management device 20*a* first encrypts and transmits the application key to an application-key management device 20*c*, by using the quantum cryptographic key (QKD link 1). Then, the application-key management device 20*c* encrypts and transmits the application key to the application-key management device 20*b*, by using the quantum cryptographic key (QKD link 2). The applications 30*a* and 30*b* acquire the application key from the application-key management devices 20*a* and 20*b*, respectively, at any desired timing. This completes the sharing of the application key between the starting node and the terminal node. The operation of the applications 30*a* and 30*b* after sharing the application key is the same as that of FIG. 1.

Next, a system configuration including a calculation function of a service fee of quantum cryptographic communication will be described.

Figure 3:
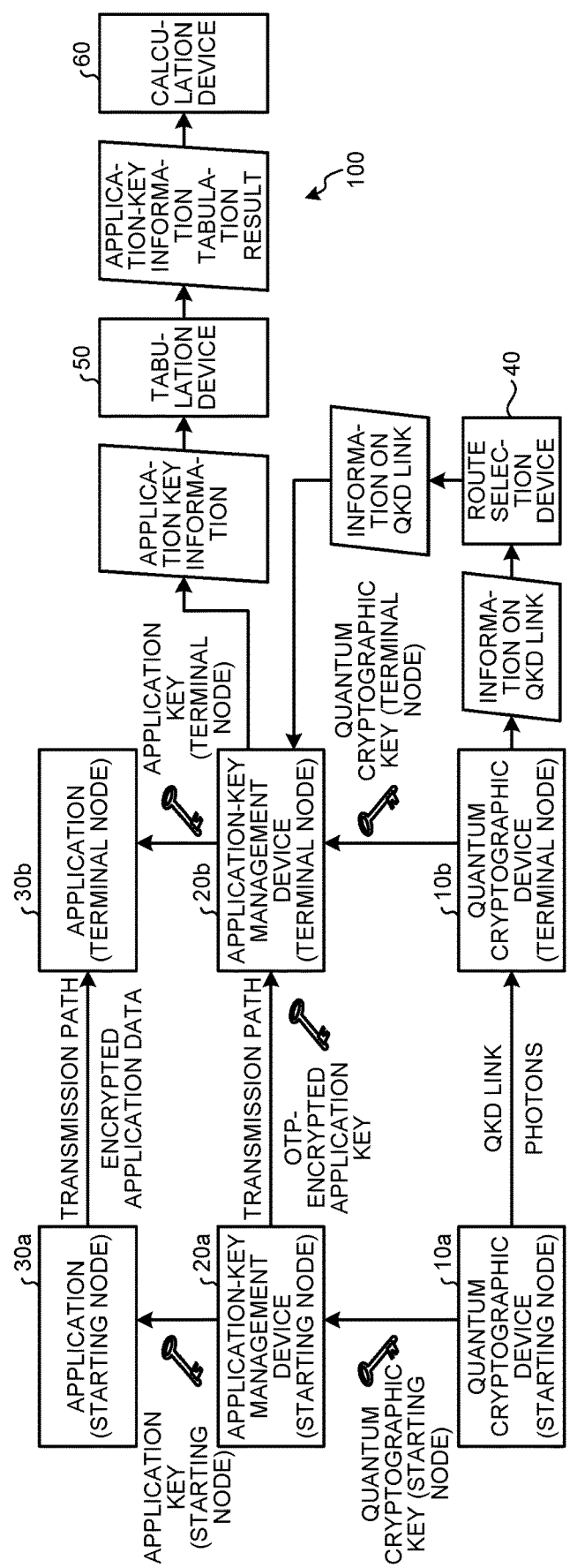
FIG. 3 is a diagram illustrating an example of a device configuration of a quantum cryptographic communication fee calculation system of the first embodiment.

Device Configuration Example of Quantum Cryptographic Communication Fee Calculation System FIG. 3 is a diagram illustrating an example of a device configuration of a quantum cryptographic communication fee calculation system 100 of the first embodiment. The quantum cryptographic communication fee calculation system 100 of the first embodiment includes the quantum cryptographic devices 10*a* and 10*b*, the application-key management devices 20*a* and 20*b*, the applications 30*a* and 30*b*, a route selection device 40, a tabulation device 50, and a calculation device 60. The route selection device 40, the tabulation device 50, and the calculation device 60 are each implemented by a server device on a network, for example.

The description of the quantum cryptographic devices 10*a* and 10*b*, the application-key management devices 20*a* and 20*b*, and the applications 30*a* and 30*b* is the same as that of FIG. 1 and thus is omitted.

The application-key management device 20*b* transmits, each time transmitting an application key to the application 30*b*, the information on the relevant application key to the tabulation device 50. Meanwhile, the route selection device 40 receives information on the QKD link from the quantum cryptographic device 10*b*, performs the selection (optimization) of an application-key sharing route, and determines the application-key sharing route corresponding to the application key. The application-key sharing route is a route of the QKD link used in sharing the application key. Then, the route selection device 40 transmits application-key sharing route information to the tabulation device 50.

The tabulation device 50 then tabulates the information on the application key and the application-key sharing route information and outputs an application-key information tabulation result to the calculation device 60. Finally, based on the application-key information tabulation result, the calculation device 60 determines the service fee.

As in FIG. 2, when there is a relay node, the information on the QKD link needs to be collected from the relay node also. For example, in the example in FIG. 2, the route selection device 40 receives the information on the QKD link 1 from the quantum cryptographic device 10*c* (relay node) and receives the information on the QKD link 2 from the quantum cryptographic device 10*b* (terminal node).

In the following description, when the quantum cryptographic devices 10*a* to 10*c*, the application-key management devices 20*a* to 20*c*, and applications 30*a* and 30*b* are not distinguished, the foregoing is referred to simply as the quantum cryptographic communication device 10, the application-key management device 20, and the application 30, respectively.

Next, the operation of the route selection device 40 and the application-key management device 20*b* will be described.

Figures 4, 5:
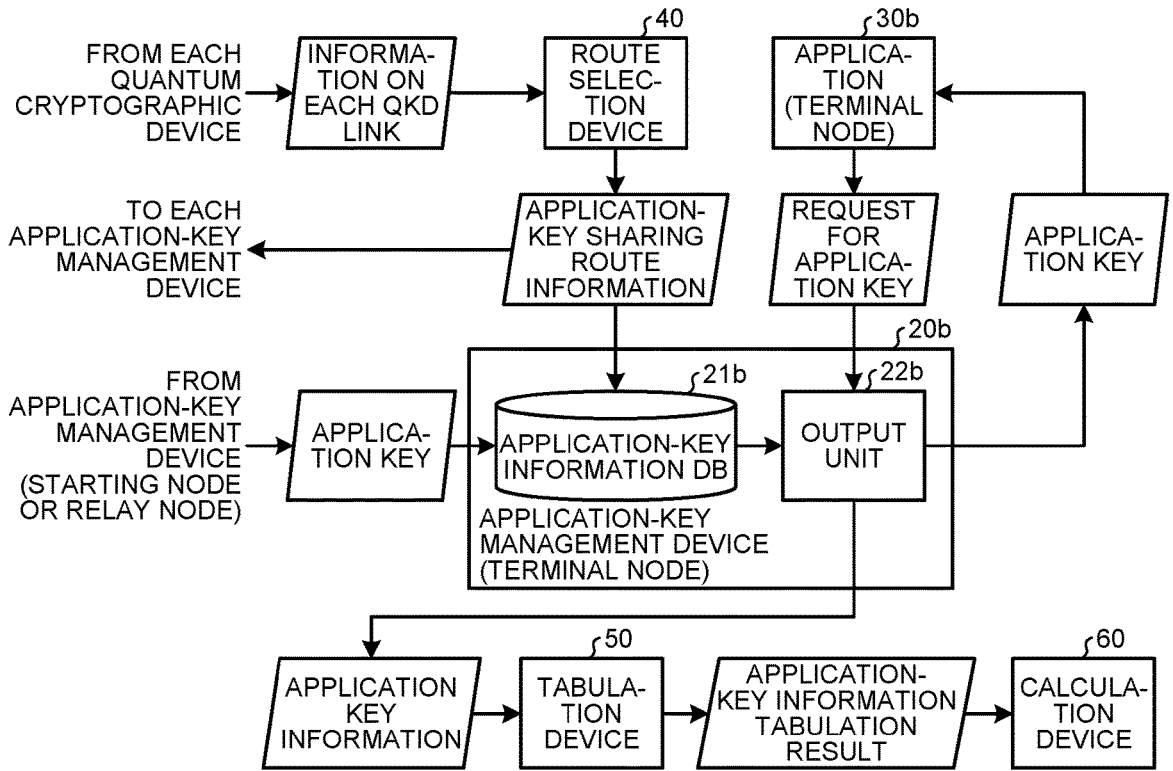
FIG. 4 is a diagram for explaining an operation of a route selection device and an application-key management device of the first embodiment.
FIG. 5 is a diagram illustrating an example of information on QKD links of the first embodiment.

FIG. 4 is a diagram for explaining the operation of the route selection device 40 and the application-key management device 20b of the first embodiment. The route selection device 40 acquires the information on each QKD link from the respective quantum cryptographic communication devices 10. Then, the route selection device 40 creates application-key sharing routes from the information on each QKD link. The route selection device 40 transmits the application-key sharing route information to the respective application-key management devices 20a to 20c (starting node, relay node, and terminal node). The reason why the application-key sharing route information is transmitted to the respective application-key management devices 20a to 20c is that each application-key management device 20 controls the route to transmit the application key.

In addition, the application-key management device 20b receives the application key from the application-key management device 20a (starting node) or the application-key management device 20c (relay node). The application-key management device 20b stores the application key and the application-key sharing route information into an application-key information DB 21b. Then, the application-key management device 20b retrieves, each time a request for an application key is received from the application 30b (terminal node), the application key from the application-key information DB 21b and transmits the relevant application key to the application 30b. At the same time, the application-key management device 20b transmits to the tabulation device 50 the information on the application key that has been transmitted to the application 30b. Then, the tabulation device 50 tabulates the information on the application key and the application-key sharing route information and outputs the application-key information tabulation result to the calculation device 60. Finally, based on the application-key information tabulation result, the calculation device 60 determines the service fee.

Next, an example of the information on each QKD link will be described.

Example of QKD Link Information

FIG. 5 is a diagram illustrating an example of information on QKD links of the first embodiment. The information on QKD links includes a link ID, the distance of the QKD link, the generation rate of a quantum cryptographic key, the storage amount of the quantum cryptographic key, and a quantum bit error rate (QbER) of the QKD link. The example in FIG. 5 indicates the information on each QKD link when a QKD network for which the number of QKD links is six is configured.

The link ID is information that identifies a link. The distance of the QKD link is a distance of an optical fiber connecting between nodes. The generation rate of a quantum cryptographic key is a rate at which the quantum cryptographic key is generated, and is expressed by a bit amount per second of the quantum cryptographic key sent from the quantum cryptographic communication device 10 to the application-key management device 20, for example. The storage amount of the quantum cryptographic key is the amount of bit data indicating the quantum cryptographic key stored in the application-key management device 20. The QbER of the QKD link is a ratio of bit errors included in a quantum cryptographic key when generating the quantum cryptographic key.

In the first embodiment, the case in FIG. 5 has been exemplified as an example of the information on QKD links, but the example of the information on QKD links is not limited to that of FIG. 5. For example, in a one-to-one network configuration (see FIG. 14 described later), if the number of QKD links is one, the storage amount of the application key may be the storage amount of the quantum cryptographic key.

Next, the application-key sharing route information will be described.

Figures 6, 7:
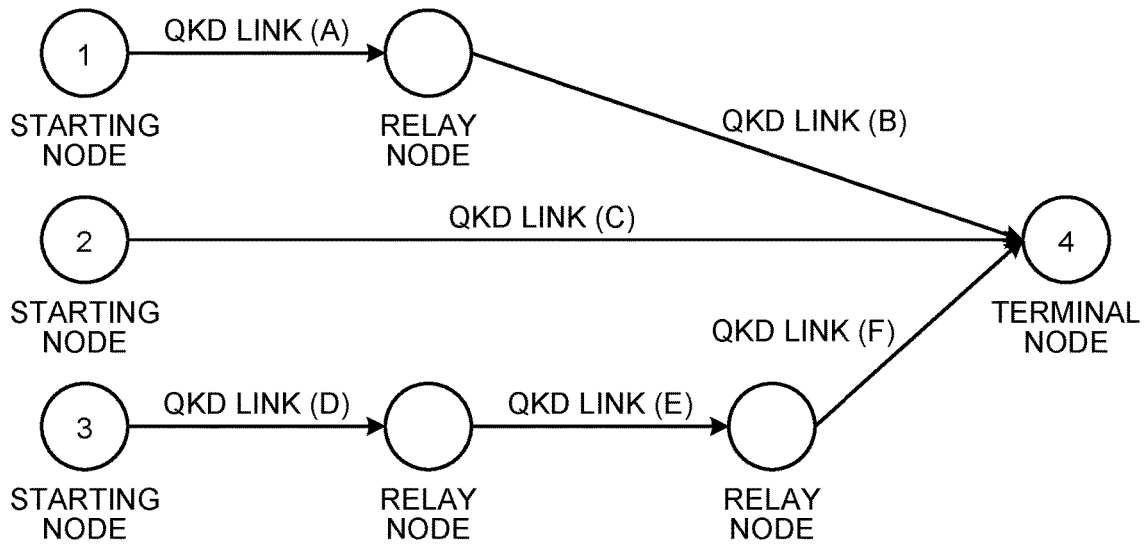
FIG. 6 is a diagram illustrating an example of application-key sharing route information in the first embodiment.
FIG. 7 is a diagram illustrating an example of a QKD network configuration of the first embodiment.

FIG. 6 is a diagram illustrating an example of the application-key sharing route information in the first embodiment. FIG. 7 is a diagram illustrating an example of a QKD network configuration of the first embodiment. The application-key sharing route information is a list of application-key sharing routes corresponding to the application key supplied to one terminal node. FIG. 6 illustrates, to one terminal node (in the examples of FIG. 6 and FIG. 7, it is referred to as terminal node 4 for convenience), a configuration in which the number of nodes that may share the application key is three.

The application-key sharing route information includes an application-key sharing destination node, the application-key sharing route, the distance, the number of relay nodes, a generation rate of the application key, and the storage amount of the application key.

The application-key sharing destination node includes all nodes that may share the application key with the terminal node (in the case of FIG. 6, starting node 1, starting node 2, and starting node 3).

The application-key sharing route indicates a route of the QKD link for which the quantum cryptographic key used for OTP encryption of the application key is transmitted and received. The application-key sharing route included in the application-key sharing route information in FIG. 6 corresponds to the QKD network configuration in FIG. 7. For example, the application-key sharing route information between the starting node 1 and the terminal node 4 indicates passing from the starting node 1 through a QKD link (A), a relay node, and a QKD link (B), and reaching the terminal node 4. Regarding the application-key sharing route information between the starting node 2 and the terminal node 4, it indicates passing from the starting node 2 through a QKD link (C) and reaching the terminal node 4. Regarding the application-key sharing route information between the starting node 3 and the terminal node 4, it indicates passing from the starting node 3 through a QKD link (D), a relay node, a QKD link (E), a relay node, and a QKD link (F), and reaching the terminal node 4.

Next, the description will move on to the distance, the number of relay nodes, the generation rate of the application key, and the storage amount of the application key in FIG. 6. For the sake of convenience of explanation, it is assumed that the parameters of the QKD link (A) through the QKD link (F) follow the information on the QKD links in FIG. 5.

First, the distance will be described. The distance indicates the distance (total distance) for which the distance of the optical fiber of each QKD link is added together. For example, in the case between the starting node 1 and the terminal node 4, because the distance of the optical fiber of the QKD link (A) is 20 km and the distance of the optical fiber of the QKD link (B) is 10 km, the distance is 20 km+10 km=30 km.

Next, the number of relay nodes will be described. The number of relay nodes is the number of relay nodes present between the starting node and the terminal node. For example, the number of relay nodes between the starting node 1 and the terminal node 4 is one, the number of relay nodes between the starting node 2 and the terminal node 4 is zero, and the number of relay nodes between the starting node 3 and the terminal node 4 is two.

Next, the application-key generation rate will be described. The application-key generation rate is a generation rate of the application key shared between the starting node and the terminal node. When sharing the application key, as the OTP-encrypted transmission using a quantum cryptographic key is performed, the generation rate of the application key in each QKD link is equal to the generation rate of the quantum cryptographic communication of each QKD link.

For example, between the starting node 1 and the terminal node 4, the QKD link (A) and the QKD link (B) are present, and according to FIG. 5, the generation rates of the respective quantum cryptographic keys are 2 Mbps and 5 Mbps. As the application-key generation rate between the starting node 1 and the terminal node 4 takes a minimum value out of them, it is 2 Mbps. This is because the application key generation of the QKD link (A) becomes a bottleneck. In a similar way, the application-key generation rate between the starting node 2 and the terminal node 4 is 500 Kbps, and the application-key generation rate between the starting node 3 and the terminal node 4 is 1 Mbps. That is, the generation rate of the application key, when there are a plurality of relay nodes relaying a QKD link through which photons used for the generation of a quantum cryptographic key are transmitted and received and the QKD link is divided into a plurality of partial QKD links by the relay nodes, is a lower generation rate of a partial quantum cryptographic key out of the generation rates of quantum cryptographic keys (partial quantum cryptographic keys) generated among the partial QKD links.

The storage amount of the application key is the amount of the application key stored in the application-key management device 20. When there are a plurality of relay nodes relaying a transmission path through which the application key is transmitted and received and the transmission path is divided into a plurality of partial transmission paths by the relay nodes, the storage amount of the application key is, out of storage amounts of the application key used among the partial transmission paths, a smaller storage amount of the application key.

The application-key sharing route information varies depending on the status of the QKD link. The timing of changing the application-key sharing route information may be at regular intervals or the timing of changing may be variable depending on the situation. For example, when the communication is unstable, the timing of changing may be set shorter.

Next, the route selection device 40 of the first embodiment will be described.

Figure 8:
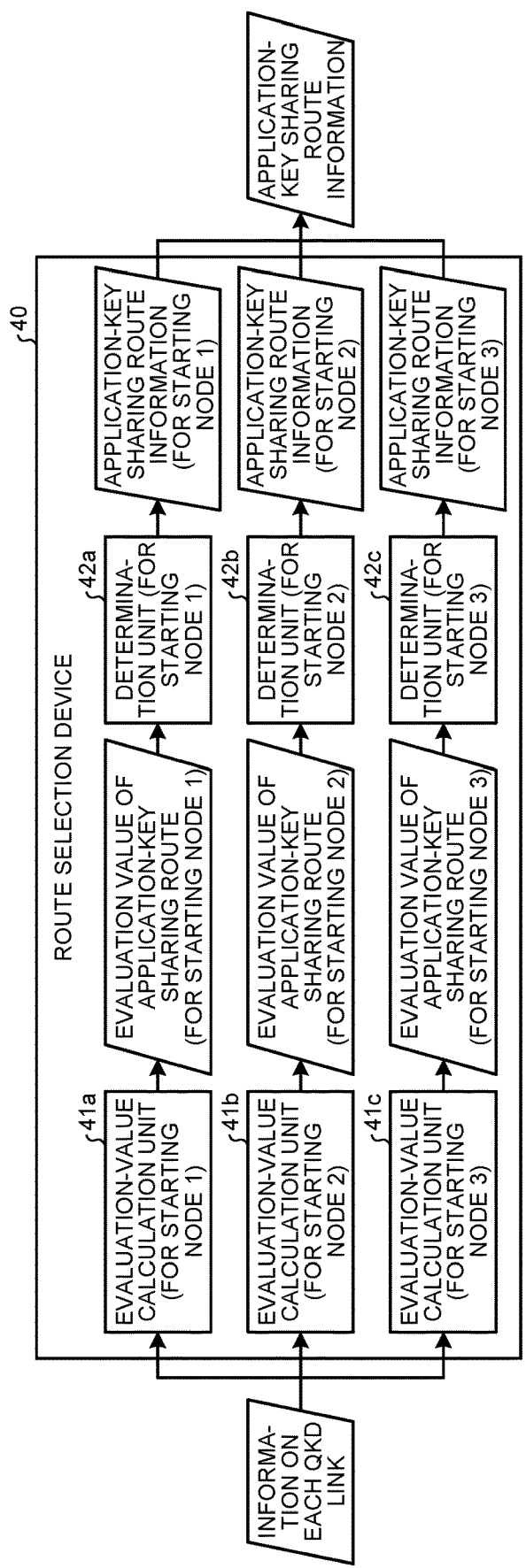
FIG. 8 is a diagram illustrating an example of a functional configuration of the route selection device of the first embodiment.

FIG. 8 is a diagram illustrating an example of a functional configuration of the route selection device 40 of the first embodiment. In the example in FIG. 8, it is assumed that, as the starting nodes sharing the application key with the terminal node 4, there are the starting node 1, the starting node 2, and the starting node 3. In the example in FIG. 8, the route selection device 40 includes evaluation-value calculation units 41*a* to 41*c* and determination units 42*a* to 42*c*. First, the information on each QKD link is input to the respective evaluation-value calculation unit 41*a* (for starting node 1), the evaluation-value calculation unit 41*b* (for starting node 2), and the evaluation-value calculation unit 41*c* (for starting node 3).

The evaluation-value calculation unit 41*a* calculates each evaluation value on the combination of the routes reaching the terminal node 4 from the starting node 1 and inputs the relevant value to the determination unit 42*a*. Similarly, the evaluation-value calculation unit 41*b* calculates each evaluation value on the combination of the routes reaching the terminal node 4 from the starting node 2 and inputs the relevant value to the determination unit 42*b*. Likewise, the evaluation-value calculation unit 41*c* calculates each evaluation value on the combination of the routes reaching the terminal node 4 from the starting node 3 and inputs the relevant value to the determination unit 42*c*.

Then, the determination units 42*a* to 42*c* determine, based on the evaluation values of the application-key sharing routes, an optimum application-key sharing route and outputs the application-key sharing route information corresponding to each of the starting nodes 1 to 3. Finally, the route selection device 40 aggregates the application-key sharing route information corresponding to the respective starting nodes 1 to 3 and outputs the aggregated application-key sharing route information.

Next, the evaluation value of the application-key sharing route will be described. The evaluation items on the application-key sharing route information include the distance, the number of relay nodes, the generation rate of the application key, and the storage amount of the application key. The descriptions of those items are as in the foregoing.

In the first embodiment, as the evaluation value is greater, it is prioritized as the application-key sharing route. Regarding the distance, because the quantum cryptographic communication generates a quantum cryptographic key by transmitting and receiving one photon, the generation rate of the quantum cryptographic key is smaller as the distance is longer, and conversely, the generation rate of the quantum cryptographic key is greater as the distance is shorter. Accordingly, as the distance is shorter, the evaluation value on the relevant distance is calculated to be greater.

Regarding the number of relay nodes, as more relay nodes are relayed, the consumption of the quantum cryptographic keys at the relay nodes increases, and it is undesirable from the perspective of the quantum cryptographic communication network. Accordingly, as the number of relay nodes is smaller, the evaluation value on the relay nodes is calculated to be greater.

Regarding the generation rate of the application key, as the generation rate of the application key is higher, the evaluation value on the generation rate of the application key is calculated to be greater.

Regarding the storage amount of the application key, as the storage amount of the application key is higher, the evaluation value on the storage amount of the application key is calculated to be greater.

Next, the method of determining the application-key sharing route information will be described. In the above description, four evaluation values of the evaluation value on the distance, the evaluation value on the number of relay nodes, the evaluation value on the generation rate of the application key, and the evaluation value on the storage amount of the application key have been mentioned. In determining the application-key sharing route, the determination units 42*a* to 42*c* take the route for which those evaluation values are the maximum, as the application-key sharing route. The determination units 42*a* to 42*c* may take, by paying attention to one evaluation value, the route for which the relevant evaluation value is the maximum, as the application-key sharing route, for example. Furthermore, for example, the determination units 42*a* to 42*c* may take, by paying attention to a plurality of evaluation values, the route for which the evaluation values equally weighted as the evaluation items are the maximum, as the application-key sharing route. For example, the determination units 42*a* to 42*c* may take, by paying attention to a plurality of evaluation values, the route for which the evaluation values differently weighted for each evaluation item are the maximum, as the application-key sharing route.

Next, the application-key information DB in the application-key management device 20b (terminal node) will be described.

FIG. 9 is a diagram illustrating an example of the application-key information DB 21b in the first embodiment. The application-key information DB 21b is a relational database and various types of data are stored in a list (table), for example. The description with the case of the terminal node 4 (see FIG. 7) will be continued.

The application-key information DB 21b of the first embodiment includes an application key ID, the starting node, a data size, the distance, the number of relay nodes, the generation rate of the application key, and the storage amount of the application key.

The application key ID is information that identifies an application key. The starting node indicates which starting node the application key is shared. For example, the application key for which the application key ID is 1 is the application key shared between the starting node 1 and the terminal node 4. The data size is the data size of the application key.

The distance, the number of relay nodes, the generation rate of the application key, and the storage amount of the application key are the same as the distance, the number of relay nodes, the generation rate of the application key, and the storage amount of the application key included in the application-key sharing route information in FIG. 6. When storing the application key information in the application-key information DB 21b, the distance, the number of relay nodes, the generation rate of the application key, and the storage amount of the application key of the application-key sharing route information in FIG. 6 are written into the application-key information DB 21b as is.

Then, when a request for an application key including the designation of an application key ID and a starting node is received from the application 30b (terminal node), an output unit 22b retrieves the application key information corresponding to the application key ID and the relevant starting node from the application-key information DB 21b according to the designation. The output unit 22b then transmits the application key to the application 30b (terminal node) and transmits the application key information corresponding to the retrieved application key to the tabulation device 50.

In the tabulation device 50, the application key information corresponding to the application key used in the application 30b (terminal node) is tabulated, and by a DB configuration identical to the application-key information DB in FIG. 9, the application key information used is tabulated.

Next, the calculation device 60 of the first embodiment will be described.

Figure 10:
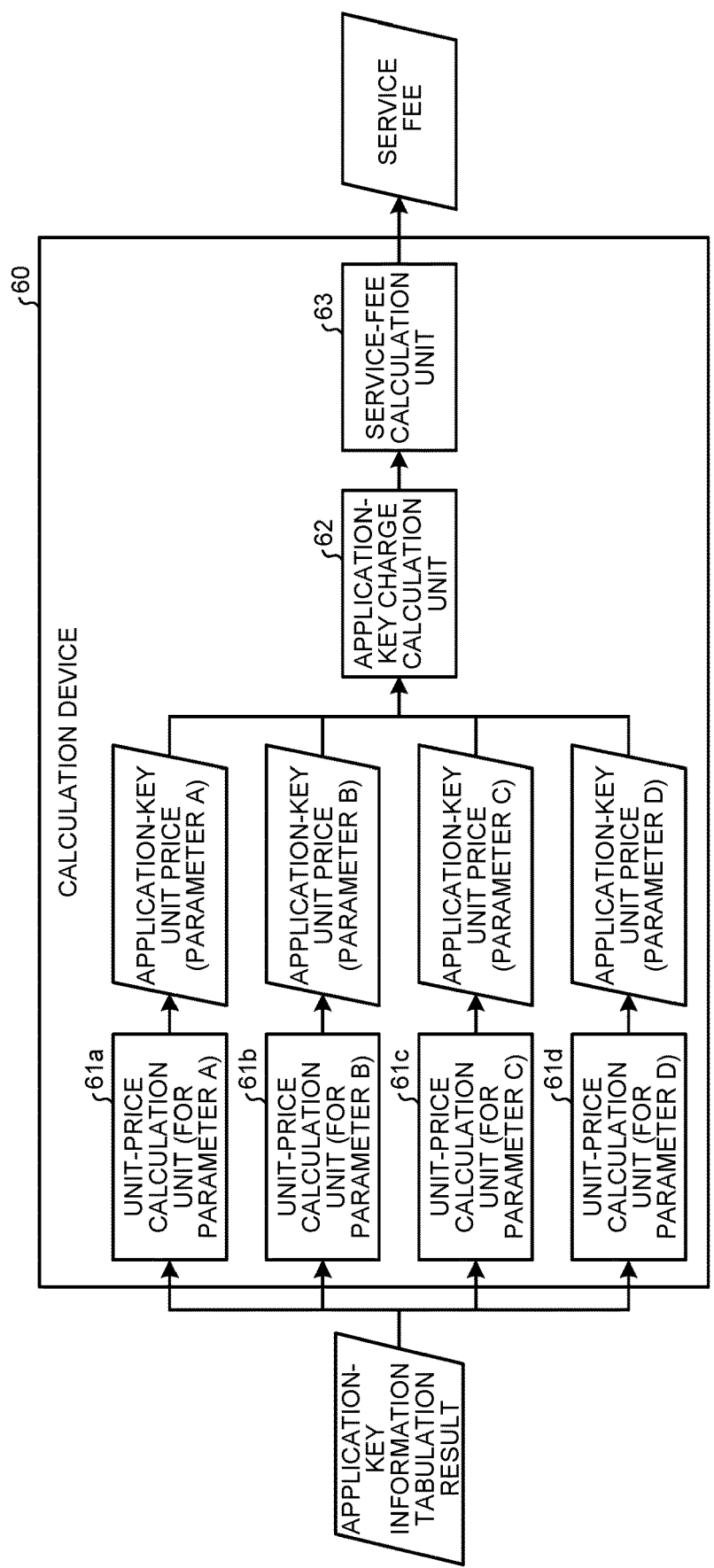
FIG. 10 is a diagram illustrating an example of a functional configuration of a calculation device of the first embodiment.

FIG. 10 is a diagram illustrating an example of a functional configuration of the calculation device 60 of the first embodiment. The calculation device 60 of the first embodiment includes unit-price calculation units 61a to 61d, an application-key charge calculation unit 62, and a service-fee calculation unit 63.

In the first embodiment, the case in which, for calculating the unit price of the application key, there are four parameters to consider will be described. The unit-price calculation units 61a to 61d calculate the unit price of the application key when focusing on certain parameters only. Then, it is assumed that a parameter A is the distance, a parameter B is the number of relay nodes, a parameter C is the generation rate of the application key, and a parameter D is the storage amount of the application key. It is further assumed that the application-key information tabulation result input to the calculation device 60 is identical to the first row of the application-key information DB in FIG. 9.

First, the value corresponding to each of the parameters included in the application-key information tabulation result is input to the respective unit-price calculation units 61a to 61d. For example, when performing the calculation concerning the parameter A (distance), the value of the distance (km) (for example, 30 km) is input to the unit-price calculation unit 61a (for parameter A). Then, the unit-price calculation unit 61a calculates, based on the value of 30 km, the application-key unit price (parameter A) and inputs the relevant application-key unit price (parameter A) to the application-key charge calculation unit 62. The application-key unit price (parameter A) is the application-key unit price when considering only the parameter A. The unit-price calculation units 61b to 61d similarly perform this calculation of the application-key unit price also on the parameter B, the parameter C, and the parameter D.

Next, the application-key charge calculation unit 62 calculates, from the application-key unit price for each parameter, the application key charge (application-key unit price) when considering all parameters. For example, the application-key charge calculation unit 62 may calculate the application-key unit price by equally weighting for each parameter, or may calculate the application-key unit price by differently weighting for each parameter. By the application-key charge calculation unit 62, the application key charge for 1 Mbit of data considering the four parameters is calculated, and the relevant application key charge is input to the service-fee calculation unit 63.

The service-fee calculation unit 63 accumulates the application key charge calculated by the application-key charge calculation unit 62. Then, the service-fee calculation unit 63 charges, when charging a user for the service fee, the user for the accumulated charges as the service fee. The foregoing is the flow up to the service fee charge.

Next, the method of calculating the application-key unit price will be described.

When the parameter is the distance, because the optical fiber costs more in a longer distance, the unit-price calculation unit 61a increases the unit price of the application key as the distance is longer.

When the parameter is the number of relay nodes, the unit-price calculation unit 61b increases the unit price of the application key as the number of relay nodes is more. This is because the consumption of the quantum cryptographic keys in the relay nodes increases in addition to an increase in device cost as the number of the quantum cryptographic devices 10c (relay node) is increased when the number of relay nodes is more.

When the parameter is the generation rate of the application key, the unit-price calculation unit 61c increases the unit price of the application key as the generation rate of the application key is smaller. This is because the sharing speed of the application key is smaller and rarer, as the generation rate of the application key is smaller.

When the parameter is the storage amount of the application key, the unit-price calculation unit 61d increases the unit price of the application key as the storage amount of the application key is smaller. This is because the application key is rarer, as the storage amount of the application key is smaller.

As the parameters to consider when calculating the application key charge, the four parameters of the distance, the number of relay nodes, the generation rate of the application key, and the storage amount of the application key have been mentioned, but the other possible parameter is the consumption speed of the application key that the application (terminal node) consumes. In this case, the unit price of the application key may be increased as the consumption speed of the application key is greater, for example. Conversely, because the usage amount of the application key is more as the consumption speed of the application key is greater, the unit price may be lowered for the user who uses the application key more. As for the tabulation of the consumption speed of the application key, the output unit $22b$ acquires the consumption speed of the application key, sends the relevant consumption speed to the tabulation device 50, and the tabulation device 50 transmits the application-key information tabulation result including the relevant consumption speed to the calculation device 60.

Regarding the application key charge, by defining a parameter E, for example, an application-key unit-price calculation unit for the consumption speed of the application key is provided and operates so as to calculate the application-key unit price (for parameter E) for the consumption speed of the application key and input the relevant application-key unit price (for parameter E) to the application-key charge calculation unit 62.

As in the foregoing, in the quantum cryptographic communication fee calculation system 100 of the first embodiment, the tabulation device 50 tabulates the information on the application key transmitted and received by using the quantum cryptographic key and outputs the application-key information tabulation result. Then, the calculation device 60 calculates the unit price of the application key based on the application-key information tabulation result.

According to the quantum cryptographic communication fee calculation system 100 of the first embodiment, it is possible to vary the unit price of the application key transmitted by the cryptographic communication using the cryptographic key generated by the quantum cryptographic communication system to a more appropriate value depending on the usage of the application key. As a result, it also has an effect in that, because the application key is valuable in a situation where the application key generated by using the quantum cryptographic communication system is exhausted, for example, the profit in the service fee is easily made as compared with the case of a fixed unit price.

Second Embodiment

Next, a second embodiment will be described. In the description of the second embodiment, the description the same as that of the first embodiment will be omitted and portions different from the first embodiment will be described.

In the first embodiment, the service fee has been calculated from the application key information that is output from the application-key management device 20b, but it may be configured such that the service fee is calculated by outputting the application key information from the application 30b (terminal node). In addition, the calculation device 60 may display the display information indicating the unit price of the application key on a display device 70.

Figure 11:
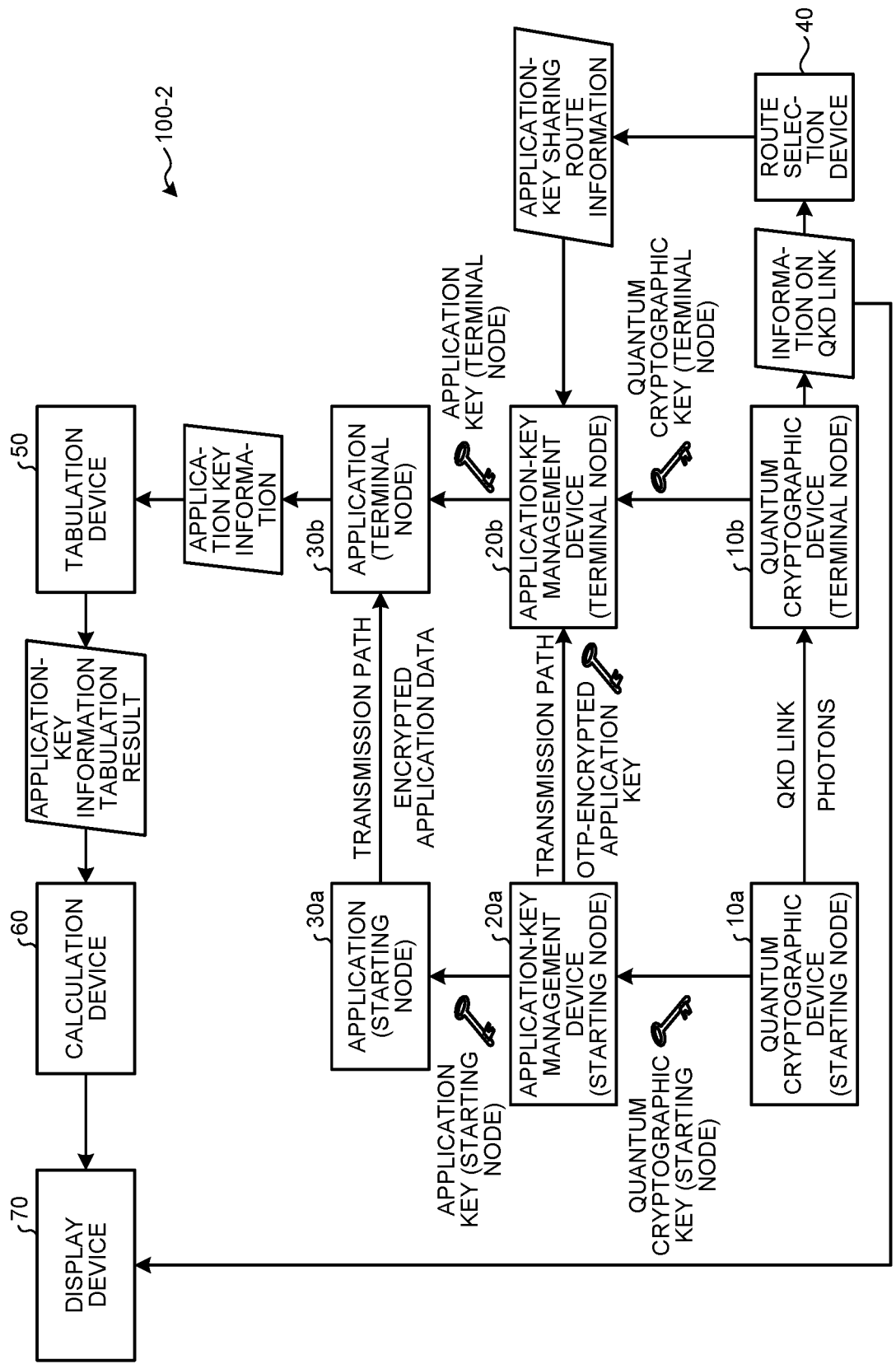
FIG. 11 is a diagram illustrating an example of a device configuration of a quantum cryptographic communication fee calculation system according to a second embodiment.

Device Configuration Example of Quantum Cryptographic Communication Fee Calculation System FIG. 11 is a diagram illustrating an example of a device configuration of a quantum cryptographic communication fee calculation system 100-2 of the second embodiment. The quantum cryptographic communication fee calculation system 100-2 of the second embodiment includes the quantum cryptographic devices 10a and 10b, the application-key management devices 20a and 20b, the applications 30a and 30b, the route selection device 40, the tabulation device 50, the calculation device 60, and the display device 70. In the second embodiment, the display device 70 has been further added to the configuration of the first embodiment.

In the second embodiment, the application 30b (terminal node) acquires the application key from the application-key management device 20b (terminal node) and also acquires the application key information at the same time, and subsequently, transmits the application key information on the application key that has been used to the tabulation device 50, which is the flow of calculating the service fee.

In addition, the display device 70 displays display information indicating the unit price of the application key.

Example of Display Information

Figure 12:
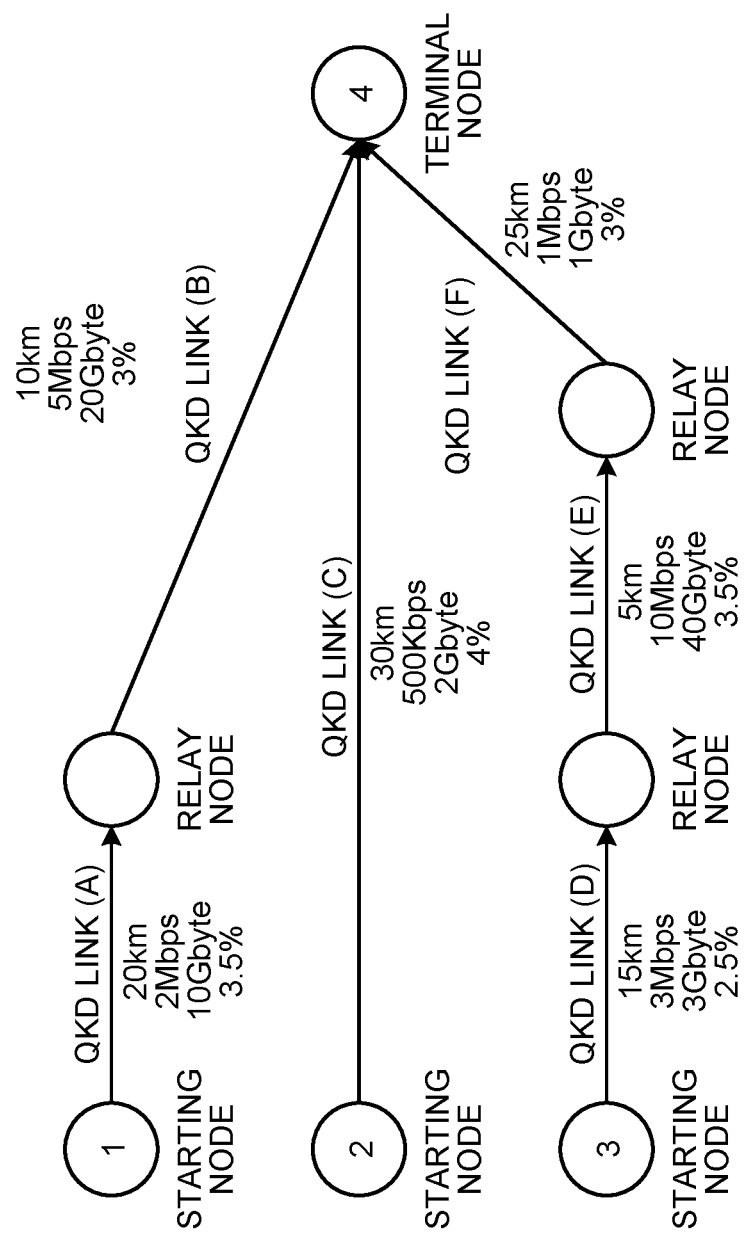
FIG. 12 is a diagram illustrating an example of display information in the second embodiment.
Figure 13:
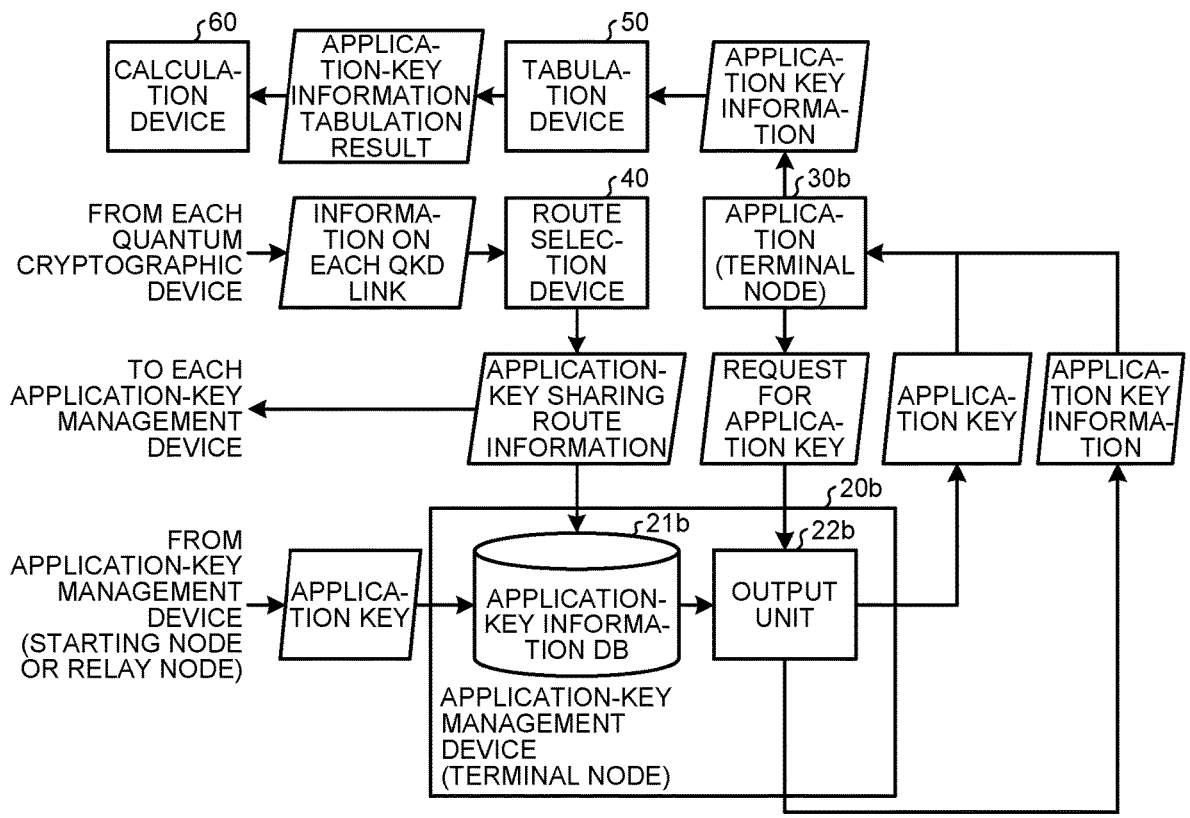
FIG. 13 is a diagram for explaining an operation of a route selection device and an application-key management device of the second embodiment.

FIG. 12 is a diagram illustrating an example of the display information in the second embodiment. The example in FIG. 12 indicates the case of displaying the unit price of the application key for each route. Furthermore, for each QKD link, displayed are the distance of the QKD link, the generation rate of the quantum cryptographic key, the storage amount of the quantum cryptographic key, and the QbER of the QKD link. For example, in the QKD link (A), the distance of the QKD link is 20 km, the generation rate of the quantum cryptographic key is 2 Mbps, the storage amount of the quantum cryptographic key is 10 Gbytes, and the QbER of the QKD link is 3.5%.

In the above-described first and the second embodiments, the tabulation device 50 and the calculation device 60 have been placed on the terminal node side, but the tabulation device 50 and the calculation device 60 may be placed on the starting node side. In the case of the starting node side, the processing the same as that in the first or the second embodiment is performed, each time the application 30a (starting node) acquires the application key from the application-key management device 20a (starting node). Specifically, the application 30a (starting node) transmits a request for an application key to the application-key management device 20a (starting node), and each time the application key is acquired, the application-key management device 20a (starting node) transmits the application key information to the tabulation device 50, and the service fee is calculated (a modification of the first embodiment). Furthermore, the application 30a (starting node) acquires the application key from the application-key management device 20a (starting node) and also acquires the application key information at the same time. Then, the application 30a (starting node) transmits the application key information corresponding to the application key that has been consumed to the tabulation device 50 (a modification of the second embodiment).

Similarly, the route selection device 40 may be placed on the starting node side. In the case of the starting node side, the information on the QKD link is received from the quantum cryptographic device 10a (starting node).

Third Embodiment

Next, a third embodiment will be described. In the description of the third embodiment, the description the same as that of the first embodiment will be omitted and portions different from the first embodiment will be described. In the third embodiment, the case of using the quantum cryptographic key as the application key will be described.

Example of Basic Configuration

Figure 14:
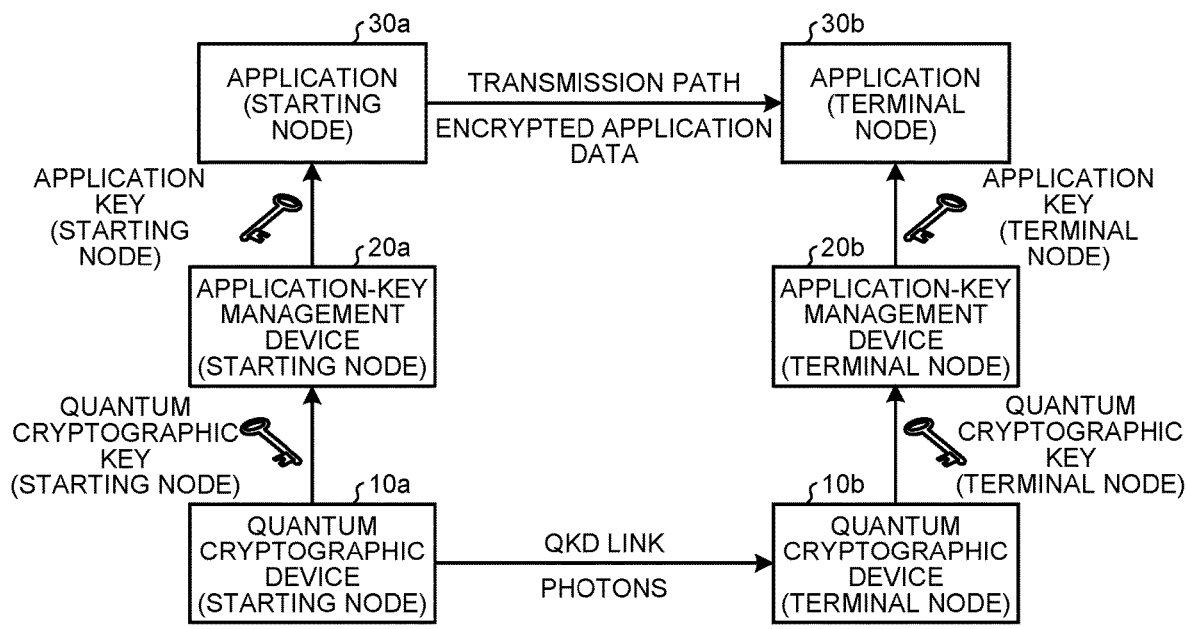
FIG. 14 is a diagram illustrating an example of a basic configuration of a quantum cryptographic communication system according to a third embodiment.

FIG. 14 is a diagram illustrating an example of the basic configuration of a quantum cryptographic communication system of the third embodiment. As in FIG. 14, in a network configuration of quantum cryptographic communication, in the case of the configuration of a single starting node and a single terminal node, that is, the communication in which there is no relay node, it is possible to use the quantum cryptographic key (starting node) as the application key (starting node) and the quantum cryptographic key (terminal node) as the application key (terminal node).

In the case of the third embodiment, as there is no need to perform the processing (processing of generating the application key, OTP encryption using the quantum cryptographic key, and transmission of the OTP-encrypted application key) performed in the application-key management device 20a (starting node) described when explaining the first example (see FIG. 1) of the basic configuration of the first embodiment and to perform the processing (OTP decryption and decryption processing of the application key) performed in the application-key management device 20b (terminal node), the burdens on the application-key management devices 20a and 20b are reduced. Regarding the configuration of the quantum cryptographic communication fee calculation system including the route selection device 40, the tabulation device 50, and the calculation device 60, it follows the configuration of the first embodiment (see FIG. 3) or the configuration of the second embodiment (see FIG. 11).

Fourth Embodiment

Next, a fourth embodiment will be described. In the description of the fourth embodiment, the description the same as that of the first embodiment will be omitted and portions different from the first embodiment will be described. In the fourth embodiment, the case where a quantum cryptographic communication device has the functions of the above-described route selection device 40, the tabulation device 50, the calculation device 60, and the display device 70 will be described.

Example of Functional Configuration

Figure 15:
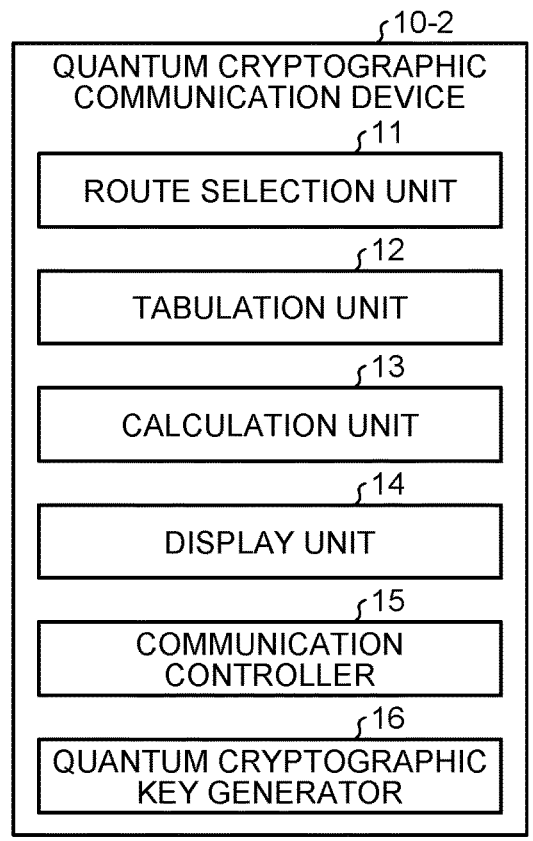
FIG. 15 is a diagram illustrating an example of a functional configuration of a quantum cryptographic communication device according to a fourth embodiment.

FIG. 15 is a diagram illustrating an example of the functional configuration of a quantum cryptographic communication device 10-2 of the fourth embodiment. The quantum cryptographic communication device 10-2 of the fourth embodiment includes a route selection unit 11, a tabulation unit 12, a calculation unit 13, a display unit 14, a communication controller 15, and a quantum cryptographic key generator 16.

The route selection unit 11 selects, when there are a plurality of routes of the transmission path where the application key is transmitted and received (QKD link where the quantum cryptographic key is transmitted and received), the route of a greater evaluation value evaluating the relevant route. For example, the route selection unit 11 increases the evaluation value as the distance of the route of the transmission path is smaller. For example, the route selection unit 11 increases the evaluation value as the number of relay nodes included in the route of the transmission path is smaller. For example, the route selection unit 11 increases the evaluation value for a route having a greater generation rate of the application key. For example, the route selection unit 11 increases the evaluation value for a route having a greater storage amount of the application key.

The tabulation unit 12 tabulates the information on the application key transmitted and received by using the quantum cryptographic key and outputs the application-key information tabulation result. For example, the tabulation unit 12 receives, when the application-key management device 20b transmits the application key to the application 30b, the information on the application key from the application-key management device 20b. For example, the tabulation unit 12 receives, when the application 30b consumed the application key, the information on the application key from the application 30b.

The calculation unit 13 calculates the unit price of the application key based on the application-key information tabulation result. For example, when the information on the application key includes the distance of the QKD link through which the photons used for the generation of the quantum cryptographic key are transmitted and received, the calculation unit 13 increases the unit price of the application key as the distance of the QKD link is greater. For example, when the information on the application key includes the number of relay nodes relaying the QKD link through which the photons used for the generation of the quantum cryptographic key are transmitted and received, the calculation unit 13 increases the unit price of the application key as the number of relay nodes is greater.

For example, when the information on the application key includes the generation rate of the application key, the calculation unit 13 increases the unit price of the application key as the generation rate of the application key is slower. For example, when the information on the application key includes the storage amount of the application key, the calculation unit 13 increases the unit price of the application key as the storage amount of the application key is smaller. For example, when the information on the application key includes the consumption speed of the application key, the calculation unit 13 increases the unit price of the application key as the consumption speed of the application key is faster.

The display unit 14 displays the display information (see FIG. 12) including the unit price of the application key.

The communication controller 15 controls the communication of the quantum cryptographic communication device 10-2. The quantum cryptographic key generator 16 generates the quantum cryptographic key based on the photons transmitted and received via the QKD link.

Finally, an example of the hardware configuration of the quantum cryptographic communication device 10 (10-2) of the first to the fourth embodiments will be described.

Example of Hardware Configuration

Figure 16:
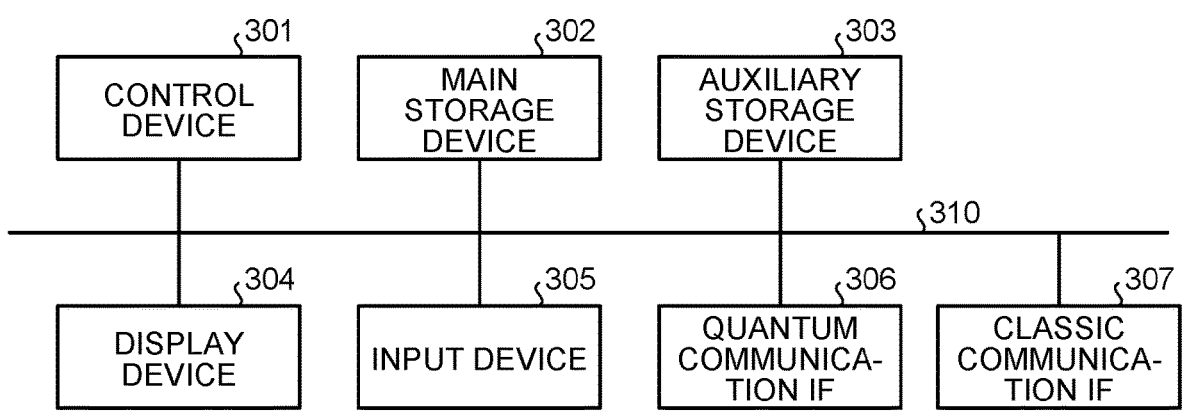
FIG. 16 is a diagram illustrating an example of a hardware configuration of a principal portion of the quantum cryptographic communication device of the first to the fourth embodiments.

FIG. 16 is a diagram illustrating an example of the hardware configuration of a principal portion of the quantum cryptographic communication device 10 (10-2) of the first to the fourth embodiments. The quantum cryptographic communication device 10 (10-2) of the first to the fourth embodiments includes a control device 301, a main storage device 302, an auxiliary storage device 303, a display device 304, an input device 305, a quantum communication interface (IF) 306, and a classic communication IF 307.

The control device 301, the main storage device 302, the auxiliary storage device 303, the display device 304, the input device 305, the quantum communication IF 306, and the classic communication IF 307 are connected via a bus 310.

The control device 301 executes a computer program that is read out from the auxiliary storage device 303 to the main storage device 302. The main storage device 302 is a memory such as a read only memory (ROM), a random access memory (RAM), and the like. The auxiliary storage device 303 is a hard disk drive (HDD), a memory card, and the like.

The display device 304 displays the status and the like of the quantum cryptographic communication device 10 (10-2). The input device 305 receives the input from a user.

The quantum communication IF 306 is an interface for connecting to a QKD link. The classic communication IF 307 is an interface for connecting to a transmission path.

The computer programs executed in the quantum cryptographic communication device 10 (10-2) of the first to the fourth embodiments are recorded in a computer-readable recording medium such as a CD-ROM, a memory card, a CD-R, a digital versatile disc (DVD), and the like in a file of an installable or executable format and provided as a computer program product.

Furthermore, the computer programs executed by the quantum cryptographic communication device 10 (10-2) of the first to the fourth embodiments may be stored in a computer connected to a network such as the Internet, and be provided by downloading via the network.

The computer programs that the quantum cryptographic communication device 10 (10-2) of the first to the fourth embodiments execute may be provided, without downloading, via a network such as the Internet.

The computer programs executed by the quantum cryptographic communication device 10 (10-2) of the first to the fourth embodiments may be provided by embedding in a ROM or the like in advance.

The computer program executed in the quantum cryptographic communication device 10 (10-2) of the first to the fourth embodiments is in a modular configuration including, out of the functional configuration of the quantum cryptographic communication device 10 (10-2) of the first to the fourth embodiments, the functions that can be implemented by the computer program.

The functions implemented by the computer program are loaded onto the main storage device 302, as the control device 301 reads out and executes the computer program from a storage medium such as the auxiliary storage device 303 and the like. That is, the functions implemented by the computer program are generated on the main storage device 302.

A part or whole of the functions of the quantum cryptographic communication device 10 (10-2) of the first to the fourth embodiments may be implemented by the hardware such as an integrated circuit (IC) and the like. The IC is a processor that executes dedicated processing, for example.

When implementing various functions by using a plurality of processors, each processor may implement one out of the various functions or may implement two or more out of the various functions.

Furthermore, the operation mode of the quantum cryptographic communication device 10 (10-2) of the first to the fourth embodiments may be in any desired mode. The quantum cryptographic communication device 10 (10-2) of the first to the fourth embodiments may be made to operate as a device that configures a cloud system on a network, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum cryptographic device comprising:
a memory; and
one or more processors coupled to the memory and configured to:
tabulate first information on an application key encrypted to be transmitted and received by using a quantum cryptographic key and output a tabulation result;
calculate a unit price of the application key based on the tabulation result; and
display second information including the unit price of the application key,
wherein
the first information on the application key includes a distance of a quantum key distribution (QKD) link through which photons used for generation of the quantum cryptographic key are transmitted and received, and
the one or more processors are configured to:
in the tabulating, tabulate the distance of the QKD link, and
in the calculating, increase the unit price of the application key as the distance of the QKD is greater.

2. The device according to claim 1, wherein the one or more processors are configured to receive, when an application has consumed the application key, the first information on the application key from the application.

3. The device according to claim 1, wherein
the quantum cryptographic device is connected to an application-key management device configured to receive the application key from the quantum cryptographic device and to transmit the application key to an application, and
the one or more processors are configured to receive, when the application-key management device transmits the application key to the application, the first information on the application key from the application-key management device.

4. The device according to claim 1, wherein
the first information on the application key includes a number of relay nodes relaying a quantum key distribution (QKD) link through which photons used for generation of the quantum cryptographic key are transmitted and received, and
the one or more processors are configured to increase the unit price of the application key as the number of relay nodes is greater.

5. The device according to claim 1, wherein
the first information on the application key includes a generation rate of the application key, and
the one or more processors are configured to increase the unit price of the application key as the generation rate of the application key is slower.

6. The device according to claim 5, wherein, when there are a plurality of relay nodes relaying a quantum key distribution (QKD) link through which photons used for generation of the quantum cryptographic key are transmitted and received and the QKD link is divided into a plurality of partial QKD links by the relay nodes, the generation rate of the application key is, out of generation rates of partial quantum cryptographic keys generated among the partial QKD links, a lower generation rate of a partial quantum cryptographic key.

7. The device according to claim 1, wherein
the first information on the application key includes a data size of the application key, and
the one or more processors are configured to increase the unit price of the application key as the data size of the application key is smaller.

8. The device according to claim 7, wherein, when there are a plurality of relay nodes relaying a transmission path through which the application key is transmitted and received and the transmission path is divided into a plurality of partial transmission paths by the relay nodes, the data size of the application key is, out of data sizes of the application key used among the plurality of partial transmission paths, a smaller data size of the application key.

9. The device according to claim 8, wherein the one or more processors are further configured to select, when there are a plurality of routes of the transmission path, a route of a greater evaluation value evaluating the route.

10. The device according to claim 9, wherein the one or more processors are configured to increase the evaluation value as a distance of the route of the transmission path is smaller.

11. The device according to claim 9, wherein the one or more processors are configured to increase the evaluation value as a number of relay nodes included in the route of the transmission path is smaller.

12. The device according to claim 9, wherein the one or more processors are configured to increase the evaluation value for the route having a greater generation rate of the application key.

13. The device according to claim 9, wherein the one or more processors are configured to increase the evaluation value for the route having a greater data size of the application key.

14. The device according to claim 1, wherein
the first information on the application key includes a consumption speed of the application key, and
the one or more processors are configured to increase the unit price of the application key as the consumption speed of the application key is faster.

15. A quantum cryptographic communication fee calculation system comprising:
a tabulation device comprising a hardware processor configured to tabulate first information on an application key encrypted to be transmitted and received by using a quantum cryptographic key and output a tabulation result;
a calculation device comprising a hardware processor configured to calculate a unit price of the application key based on the tabulation result; and
a display device comprising a hardware processor configured to display second information including the unit price of the application key,
wherein
the first information on the application key includes a distance of a quantum key distribution (QKD) link through which photons used for generation of the quantum cryptographic key are transmitted and received,
in the tabulating, the distance of the QKD link is tabulated, and
in the calculating, the unit price of the application key is increased as the distance of the QKD is greater.

16. A quantum cryptographic communication fee calculation method comprising:
tabulating, by a quantum cryptographic device, first information on an application key encrypted to be transmitted and received by using a quantum cryptographic key and outputting a tabulation result;
calculating, by the quantum cryptographic device, a unit price of the application key based on the tabulation result; and
displaying, by the quantum cryptographic device, second information including the unit price of the application key,
wherein
the first information on the application key includes a distance of a quantum key distribution (QKD) link through which photons used for generation of the quantum cryptographic key are transmitted and received,
in the tabulating, the distance of the QKD link is tabulated, and
in the calculating, the unit price of the application key is increased as the distance of the QKD link is greater.

* * * * *